United States Patent [19]
Brockmann et al.

[11] Patent Number: 5,784,550
[45] Date of Patent: Jul. 21, 1998

[54] METHOD FOR ENHANCED FUNCTIONAL TESTING OF A PROCESSOR USING DYNAMIC TRAP HANDLERS

[75] Inventors: Russell C. Brockmann; Karl Brummel, both of Fort Collins, Colo.

[73] Assignee: Hewlett-Packard Company, Palo Alto, Calif.

[21] Appl. No.: 739,244

[22] Filed: Oct. 29, 1996

[51] Int. Cl.$^6$ .................................................. G06F 11/00
[52] U.S. Cl. .................................................. 395/183.09
[58] Field of Search ........................ 395/183.01, 183.04, 395/183.08, 183.09

[56] References Cited

U.S. PATENT DOCUMENTS

4,074,353  2/1978  Woods et al. .
5,146,460  9/1992  Ackerman et al. .

*Primary Examiner*—Albert Decady

[57] ABSTRACT

During generation of a test case, in response to a predictable interrupt condition a dynamic portion of a dynamic trap handler is created. The static portion of the dynamic trap handler is generic trap handler code that is not dynamically created and performs such routine tasks as loading the trap number of the interrupt condition, loading a trap code pointer and preparing the processor to branch to the location pointed to by the trap code pointer. The dynamic portion of the trap handler, however, is dynamically created in response to each interrupt condition which occurs. The unique series of instructions of the dynamic portion of the trap handler may be tailored as desired to perform any number of tasks, including verifying the trap handler, verifying trap parameters, generating code to return to a new location upon completion of the trap handler, fixing the interrupt condition, updating the trap vector table, and updating the trap code pointer and a trap data pointer. Any number of other tasks may also be added to the dynamic portion of the trap handler.

20 Claims, 4 Drawing Sheets

| Trap Type | Trap Number |
| --- | --- |
| Undefined Trap | 0 |
| High Priority Machine Check | 1 |
| Power Fail Interrupt | 2 |
| Recovery Counter Trap | 3 |
| External Interrupt | 4 |
| Low Priority Machine Check | 5 |
| ITLB Miss Trap | 6 |
| ITLB Memory Protection Trap | 7 |
| Illegal Instruction Trap | 8 |
| Break Instruction Trap | 9 |
| Privileged Operation Trap | 10 |
| Privileged Register Trap | 11 |
| ALU Overflow Trap | 12 |
| ALU Condition Trap | 13 |
| FP Assist Exception Trap | 14 |
| DTLB Miss Trap | 15 |
| Non-Access ITLB Miss Trap | 16 |
| Non-Access DTLB Miss Trap | 17 |
| DTLB Memory Protection Trap | 18 |
| DTLB Memory Break Trap | 19 |
| DTLB Dirty Trap | 20 |
| DTLB Page Reference Trap | 21 |
| Assist Emulation Trap | 22 |
| Higher Privilege Transfer Trap | 23 |
| Lower Privilege Transfer Trap | 24 |
| Taken Branch Trap | 25 |
| DTLB Memory Access Rights Trap | 26 |
| DTLB Memory Protection Trap | 27 |
| Data Alignment Trap | 28 |
| Performance Monitor Trap | 29 |
| Undefined Trap 30 | 30 |
| Undefined Trap 31 | 31 |

*FIG. 1*

IVA Table

Interrupt Vector Address (VIA) ⟶

| | [This trap vector is unused] |

1    High Priority Machine Check

[Random Instructions]
Load "1" into an unused register.
Load the next trap code pointer into a register.
Branch to the next trap code handler that was loaded into a register in the previous instruction.

2    Power Fail Interrupt

[Random Instructions]
Load "2" into an unused register.
Load the next trap code pointer into a register.
Branch to the next trap code handler that was loaded into a register in the previous instruction.

3    Recovery Counter Trap

[Random Instructions]
Load "3" into an unused register.
Load the next trap code pointer into a register.
Branch to the next trap code handler that was loaded into a register in the previous instruction.

4    External Interrupt

[Random Instructions]
Branch to generic trap handler.

5    Low Priority Machine Check

[Random Instructions]
Load "5" into an unused register.
Load the next trap code pointer into a register.
Branch to the next trap code handler that was loaded into a register in the previous instruction.

o
o
o

29    Performance Monitor Trap

[Random Instructions]
Load "29" into an unused register.
Load the next trap code pointer into a register.
Branch to the next trap code handler that was loaded into a register in the previous instruction.

30    Undefined Trap

[This trap vector is unused]

31    Undefined Trap

[This trap vector is unused]

METHOD FOR ENHANCED FUNCTIONAL TESTING OF A PROCESSOR USING DYNAMIC TRAP HANDLERS

BACKGROUND OF THE INVENTION

This invention relates generally to functional verification of processors and more particularly to enhanced functional verification of processors using a random code generator that dynamically generates trap handlers in response to interrupt conditions.

Newly designed processors must be functionally tested to confirm that they perform as expected. CPU (Central Processing Unit) chips, microprocessors, or other similarly complicated VLSI (Very Large Scale Integration) devices are examples of processors which typically need to be functionally verified before mass production.

Such processors are typically functionally verified through the use of a simulation scheme. An architectural simulator, characterized as a high-level simulator that is modeled upon the architectural properties of the processor to be tested, may be used to obtain an expected state of the processor upon executing a test case. The test case may be characterized as a sequence of one or more instructions capable of testing one or more functional attributes of the processor. Thus, the test case may test any function of the processor, including control logic, memory, registers, cache, and TLBs (Translation Lookaside Buffers). The architectural simulator may be developed separately and in isolation from the processor in a "clean room" arrangement so that any functional flaws inherent to the processor are not inadvertently incorporated in the architectural simulator. For the same reason, the architectural simulator is modeled upon the architectural qualities of the processor rather than merely upon the functionality of the processor.

Following simulation by the architectural simulator to obtain the expected state of the processor, the test case is then executed on either the actual processor being tested or on a functional model simulator that is capable of simulating the functional attributes, often down to the gate level, of the processor in order to obtain the actual state of the processor upon executing the test case. The functional model simulator is typically written in a hardware modeling language, as is well known in the art. The test case executed on the functional model simulator or on the processor itself may be prematurely aborted if a functional problem is detected.

Following execution of the test case on the processor or the functional model simulator, the actual state of the processor is compared to the expected state of the processor produced by the architectural simulator in order to determine if the processor has any functional problems. Discrepancies between the expected state and the actual state of the processor are indicative of a functional failure of the processor in executing the test case.

Figure 1:
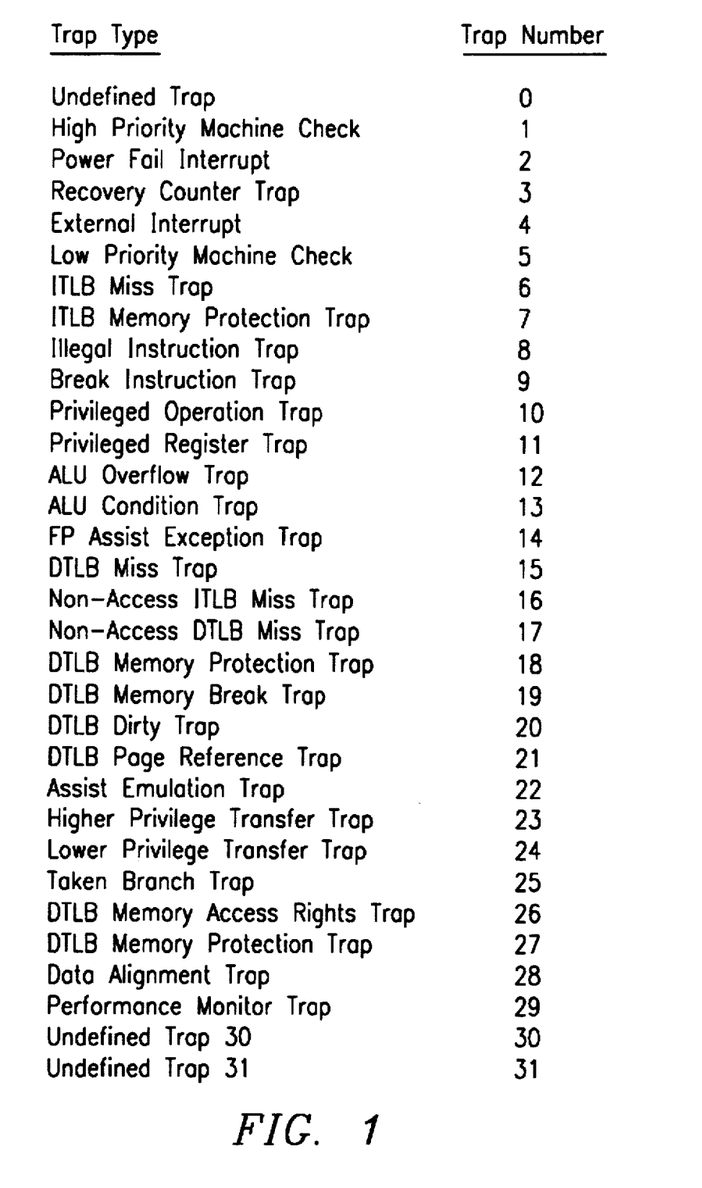
FIG. 1 illustrates the trap types and corresponding trap numbers of the HP-PA (HP-Precision Architecture)

The test case or test cases used to functionally test the processor may be generated by a random code generator. Random code generators are considered an inexpensive, efficient, and reliable means of randomly generating test programs and thus are a favored part of the functional verification of complex processors. The presence of an interrupt, fault, trap, or exception, hereinafter referred to as an interrupt condition, however, makes random code generators more complex and difficult to use. An interrupt condition may be caused by an internal processor error condition, such as division by zero, attempted access of protected areas of storage, a translation lookaside buffer (TLB) miss or an arithmetic operation that results in an overflow condition. An interrupt condition may also be caused by conditions external to the processor, such as an external interrupt. By way of example, the trap types corresponding to interrupt conditions that will cause a trap in the HP-PA (Hewlett-Packard Precision Architecture) are shown in FIG. 1.

Random code generators, being random in nature, are likely to produce interrupt conditions that may be either predictable or unpredictable in nature. While some interrupt conditions, such as an external interrupt invoked, for instance, by a parallel processor in a multiprocessor environment or by a disk drive, are almost always unpredictable, the predictability of an interrupt condition is influenced at least in part by the amount of effort put into the architectural simulator to model events that depend on actual hardware simulation. With an on-chip TLB of a CPU chip having no entries in use, for instance, it is easy to predict whether or not a translation will cause an interrupt condition. But when the TLB fills up, unless the architectural simulator accurately models the CPU chip's TLB replacement algorithm, additional traps become difficult or impossible to predict. Because the more closely the architectural simulator is modeled on the processor the more likely it is to contain the hardware errors of the processor, the amount of detail designed into the architectural simulator must be weighed.

Generally when an interrupt condition occurs, important information is loaded into certain registers of the processor and an interrupt condition service routine, hereinafter referred to as a "trap handler", is executed in response to the interrupt condition. Following execution of the trap handler, the processor will generally return to the instruction stream that was being executed when the interrupt condition occurred.

As an example, this procedure is implemented on HP-PA in the following manner. When an interrupt condition occurs, architecturally defined registers are loaded with information about the interrupt condition itself. HP-PA registers that store trap information include the Interruption Instruction Address Offset Queue (IIAOQ), the Interruption Instruction Address Space Queue (IIASQ), the Interruption Offset Register (IOR), the Interruption Space Register (ISR), the Interruption Instruction Register (IIR), and the Interruption Processor Status Word (IPSW). The processor will then branch to the address of a trap handler which handles that type of interrupt condition. The address of the vector for a particular trap number is determined by adding the Interrupt Vector Address (IVA) to the product of the trap number and the size of a trap vector, which is 32 bytes. For each trap type, whether it be an external interrupt, an illegal instruction, or an ALU (Arithmetic Logic Unit) Overflow, etc., separate segments of code specific to the trap type determine what action will be taken in response to the interrupt condition. When an interrupt condition occurs, normal execution is interrupted and the processor begins executing trap handler code at the vector address. The trap handler code will either correct the condition causing the trap and resume normal execution by returning to the instruction stream that was being executed when the interrupt condition occurred, or abort the program.

There are several techniques commonly used to facilitate the use of random code generators to generate test cases in the presence of interrupt conditions. One technique involves ending code execution following the first trap. A problem with this technique is that it does not allow more than one interrupt condition to be handled. Further, this approach potentially restricts the length of test cases that can be run and is unable to verify that the condition which caused the interrupt is remedied if so desired.

Another technique calls for restricting the test cases generated to one trap handler at most for each type of interrupt condition that might arise. According to this technique, a trap handler would be generated for only the first divide by zero condition which is detected. Likewise, a trap handler would be generated for only the first attempted access of protected areas of memory condition which is detected, and a trap handler would be generated for only the first overflow condition which is detected.

While these techniques do allow verification of trap parameters such as when the trap occurred, they place an artificial restriction on the number of interrupt conditions that may be handled.

Yet another technique, quite different from those just described, provides writing generalized trap handlers that will respond to any trap of a given type irrespective of the actual trap parameters of the trap. Thus, a trap handler will be written for any divide by zero condition regardless of the actual trap parameters. Given the random nature of randomly generated code, however, it may be very difficult to verify the trap parameters for each trap, the trap order according to priorities, or if the trap was taken when it should not have been taken (or not taken when it should have been taken).

Each of these techniques possesses at least the limitations described. It therefore would be desirable in the art to provide a technique for the functional testing of processors which overcomes these limitations.

SUMMARY OF THE INVENTION

It is an object of the invention to provide a method for testing the functionality of processors which does not artificially restrict the lengths of test cases to be executed.

It is another object of the invention to provide a method for testing the functionality of processors which allows verification that an interrupt condition has been remedied.

It is yet another object of the invention to provide a method for testing the functionality of processors which allows any number of interrupt conditions to be handled by a trap handler.

It is further an object of the invention to provide a method for testing the functionality of processors which tests trap order, including trap priority.

It is still further an object of the invention to provide a method for testing the functionality of processors which verifies trap parameters.

It is another object of the invention to provide a method for testing the functionality of processors which can generate a dynamic trap handler capable of altering the state of a processor in a manner unrelated to a trap.

Therefore, according to the invention, a CPU chip, a microprocessor, or other type of complex processor is functionally tested to ascertain that the processor performs as expected. A test case is generated by a random code generator in a manner unique to the present invention and then simulated on an architectural simulator to obtain an expected state of the processor upon executing the test case. The generated test case is loaded and then executed on either the actual processor to be verified or on a functional model simulator to obtain the actual state of the processor after executing the test case. Comparison of the actual state of the processor to the expected state of the processor indicates whether the processor passed the test case. The processor may be functionally tested by any number of test cases which are generated, simulated and executed in this manner.

Test case generation is key to the present invention and is managed by a random code generator. After initialization, a random instruction is generated by the random code generator and then simulated. The expected state of the processor is updated. Next, when an interrupt condition or "trap" occurs, then the predictability or unpredictability of the trap is ascertained. For an unpredictable trap, such as an external interrupt condition, a static trap handler containing generic code of the type known in the art is simulated and the expected state of the processor is updated accordingly.

If, however, the interrupt condition is predictable then a dynamic portion of a dynamic trap handler is created. The static portion of the dynamic trap handler is generic trap handler code that is not dynamically created and performs such routine tasks as loading the trap number of the interrupt condition, loading a trap code pointer and preparing the processor to branch to the location pointed to by the trap code pointer. The dynamic portion of the trap handler, however, is dynamically created in response to each interrupt condition which occurs. The unique series of instructions of the dynamic portion of the trap handler may be tailored as desired to perform any number of tasks, including verifying the trap number, verifying trap parameters, generating code to return to a new location upon completion of the trap handler, fixing the interrupt condition, updating the trap vector table, and updating the trap code pointer and a trap data pointer. Any number of other tasks may also be added to the dynamic portion of the trap handler.

The dynamic portion of the trap handler is next simulated and the expected state of the processor is updated. Then, if no more instructions are to be generated, test case generation is terminated and control returns to the overall test flow. Thus, the next step is loading and then executing the generated test on the actual processor being verified or on a functional model simulator to obtain the actual state of the processor. The actual state of the processor is compared to the expected state of the processor to determine if the processor passed the functional test.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawings, wherein:

DESCRIPTION OF THE INVENTION

Figures 3, 5:
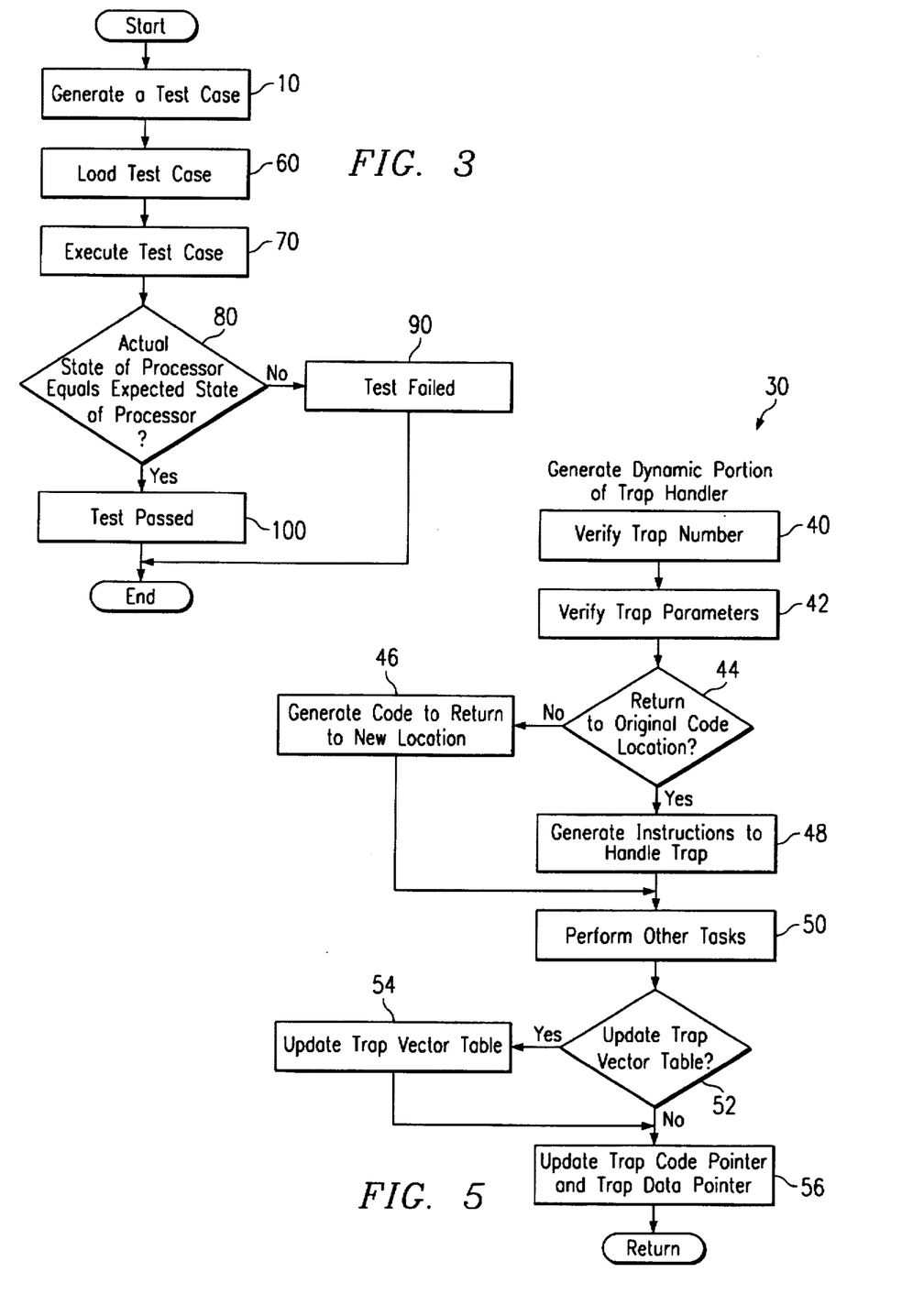
FIG. 3 illustrates the methodology for functionally verifying a processor, according to the present invention.
FIG. 5 illustrates the methodology for generating the dynamic portion of a trap handler, according to the present invention.

A processor to be functionally verified is subjected to the overall test flow illustrated in the flowchart of FIG. 3. The first step, illustrated at Block 10, is to generate a test case. The particulars of the test case generation will be explored in detail in FIGS. 4 and 5, but it should be noted that during the test case generation of Block 10 random instructions generated by a random code generator are simulated on an architectural simulator in order to obtain an expected state of the processor upon execution of the random instruction. As previously detailed, the architectural simulator is a high-level simulator that is modeled upon the architectural properties of the processor to be tested and is developed independently of the processor so as to avoid the introduction of functional flaws which may be inherent to the processor.

Following generation of a test case, at Block 60 the test case generated at Block 10 is then loaded onto an entity which will execute the test case. The entity onto which the test case is loaded for execution may be either the actual processor to be functionally verified or a functional model simulator designed to closely simulate the functional attributes of the processor, often down to the gate level. After loading the test case, at Block 70 the test case is executed by the entity onto which it was loaded to obtain the actual state of the processor following the execution. Next, at Decision Block 80, the actual state of the processor is compared with the expected state of the processor produced at Block 10. If the actual state of the processor is equal to the expected state of the processor, this means that the processor has passed the test case as indicated by Block 100. If, however, the actual state of the processor is not equal to the expected state of the processor then the processor has failed the test case as shown in Block 90. Even though a single test has been described in conjunction with the overall test flow of FIG. 3, it is understood that any number of test cases may be generated and executed in any appropriate order. For instance, a number of test cases may be generated and then tested as a batch at the same time.

Figure 4:
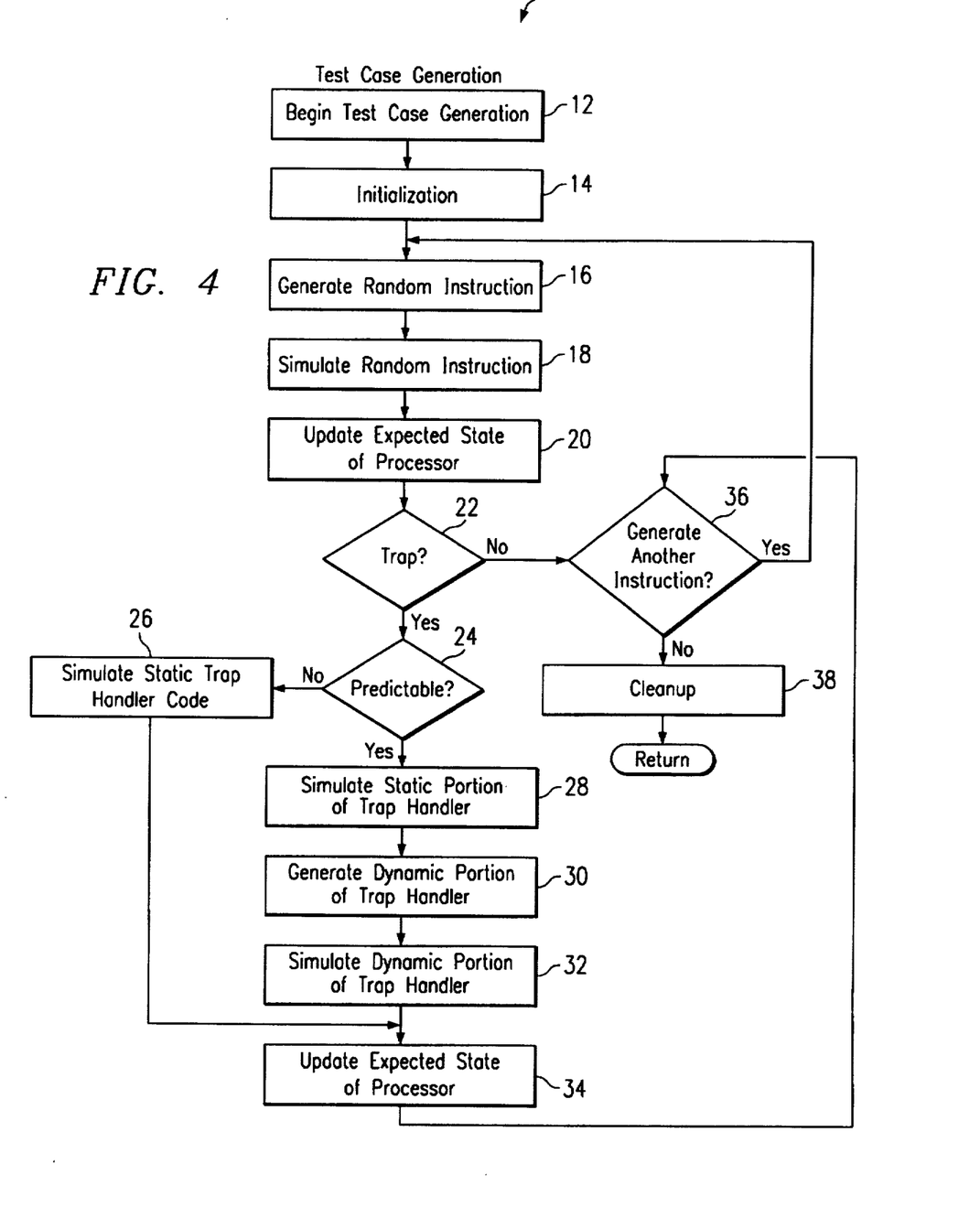
FIG. 4 illustrates the methodology for generating a test case, according to the present invention.

Referring now to FIG. 4, the details of the test case generation of Block 10 will now be described. Test case generation is typically managed by the random code generator which itself may have a built-in architectural simulator or it may invoke another process to accomplish test code generation. Test case generation begins at Block 12. During initialization at Block 14, pointers and one or more trap vector tables are initialized. Turning first to the initialization of the pointer, two locations in memory, typically registers, that will hold a trap code pointer and a trap data pointer are reserved. Initially, the trap code pointer and the trap data pointer point to memory locations that have not yet been initialized. Upon initialization, however, the trap code pointer points to the next trap handler code location and the trap data pointer points to the next trap handler data location. The location pointed to by the trap code pointer will contain the unique dynamic trap handler code generated by the random code generator in response to each predictable interrupt condition which occurs. As will be described, the trap code pointer and the trap data pointer may be updated during the generation of a dynamic portion of the trap handler.

In addition to initializing the pointers, one or more trap vector tables are initialized during initialization at Block 14. The trap vector table initialization may happen before, after, or concurrently with initialization of the pointers. The entries of the trap vector table, known as trap vectors, are initialized with instructions that will accomplish various objectives.

Following initialization, a random instruction will be generated by the random code generator at Block 16. At Block 18, the randomly generated instruction will be simulated on the architectural simulator in order to obtain an expected state of the processor upon executing this random instruction. At Block 20, the expected state of the processor is updated; the expected state may be monitored for each time it is updated or the value of the expected state may be noted only at the end of the test case generation of FIG. 4. The expected state of the processor is important information for it will later be compared with the actual state of the processor to determine if the processor passed or failed the test case.

Next, at Decision Block 22, whether a trap, or interrupt condition, has occurred must be determined. If no interrupt condition has occurred, then Decision Block 36 inquires as to whether another random instruction should be generated. If, however, there is an interrupt condition, then whether it is a predictable or an unpredictable interrupt condition must be ascertained, as shown in Decision Block 24. As previously discussed, a processor is functionally tested for its response to both predictable and unpredictable traps. In addition to predictable and unpredictable traps, it is further possible to have a predictable trap that may become unpredictable or to have an unpredictable trap that may be come predictable. For instance, a TLB table that fills up is an example of a predictable trap that becomes unpredictable once the TLB table fills up. A TLB table that is purged of all translation becomes empty and is an example of an unpredictable trap that becomes predictable. Traps that are likely to change state from predictable to unpredictable or from unpredictable to predictable will be discussed in more detail in the discussion on Block 52 of FIG. 5.

If the interrupt condition is not predictable, at Block 26 the static trap handler code for the unpredictable interrupt condition is simulated. The expected state of the processor is updated at Block 34 following this simulation. The static trap handler code is called static because it is generic code that will not change depending upon the trap parameters of the trap. The generic code will thus contain all code necessary to handle a given trap type and is well known in the art. An example of an almost always unpredictable interrupt condition is an external interrupt. As illustrated in the HP-PA IVA table of FIG. 2, upon an external interrupt the trap vector for an external interrupt immediately branches to a generic trap handler capable of handling external interrupts. It is not necessary to first load the trap number as the generic trap handler is specific to each trap and thus implicitly knows the trap number. Other interrupt conditions may be unpredictable as well; the external interrupt is cited here as an example.

While trap handler code is not dynamically created in response to an unpredictable trap, certain information concerning the unpredictable interrupt condition may be verified. For instance, it may not be known when an unpredictable trap will occur but it can be known that a trap of a certain type did occur.

If, however, the interrupt condition is predictable, then the trap handler of the predictable interrupt condition is characterized as having two portions: a static portion and a dynamic portion. The trap handler is unique to the predictable interrupt condition and to what needs to be tested at that time. At block 28, the static portion of the trap handler is simulated. The static portion of the trap handler loads the trap number, loads the trap code pointer, and prepares the processor to branch to the location pointed to by the trap code pointer. At Block 30, the dynamic portion of the trap handler is generated at the location pointed to by the trap code pointer; details of this are shown in FIG. 5. The order of Blocks 28 and 30 could be reversed since it is possible to generate the dynamic portion of the trap handler before simulating both the static portion and the dynamic portion of the trap handler.

The dynamic portion of the trap handler is simulated at Block 32 of the flow and the expected state of the processor is updated at Block 34. As in the unpredictable interrupt condition path, Decision Block 36 inquires whether another random instruction will be generated. The flow branches back to Block 16 if another random instruction is to be generated by the random code generator. If another random instruction is not to be generated, then Cleanup occurs at Block 38. At Block 38 housekeeping tasks necessary to complete generation of the test case are performed. After Block 38, the flow goes to Block 60 of FIG. 3.

FIG. 5 illustrates the details of generating the dynamic portion of the trap handler and thus expands upon Block 30. Whenever a predictable interrupt condition occurs the dynamic portion of the trap handler is created for that occurrence of the trap. The code of the dynamic portion of the trap handler is unique and is generated in response to each predictable interrupt condition which occurs. The code of the dynamic trap handler may perform any number of functions specified. Examples of functions that may commonly be included in the dynamic portion of the trap handler are shown in FIG. 5. It should be noted that any of these functions are optional and may be added or deleted from the code as desired. Randomly verifying trap parameters may be especially advantageous where there are a large number of trap parameters to check.

Block 40 illustrates that the dynamic portion of the trap handler may be written to verify the trap number of the interrupt condition. In response to a predictable interrupt condition, the dynamic portion of the trap handler expects a certain order of traps that may be verified by the trap number. The dynamic portion of the trap handler may additionally verify trap parameters as shown in Block 42. This provides for making sure that the trap occurred when and where it was expected to have occurred. Trap parameters of the HP-PA, for instance, include the Interruption Instruction Address Offset Queue (IIAOQ), the Interruption Instruction Address Space Queue (IIASQ), the Interruption Offset Register (IOR), the Interruption Space Register (ISR), the Interruption Instruction Register (IIR), and the Interruption Processor Status Word (IPSW). Certain trap parameters may not be used for every trap type. For instance, the IOR and the ISR trap parameters are only updated when a data access fault occurs.

The dynamic portion of the trap handler might or might not also allow return to an original code location other than the instruction stream that was being executed when the interrupt condition occurred as shown in Decision Block 44. If it is desired to return to a new code location, then Block 46 generates code to return to the new code location and then flows to Block 50. If, however, it is desired to return to the original code location of the instruction stream that was being executed when the trap occurred then Block 48 generates the instructions necessary to handle the trap.

An advantage of the present invention is that since the conditions of the trap are known in precise detail it is possible to take more direct action so that handling of the interrupt condition is accelerated. Acceleration of the trap handler function in this manner is desirable because simulation time is valuable.

Block 48 generates the instructions to handle the trap. There are any number of ways in which a trap may be handled. The condition causing the trap itself may be fixed. Alternately, the condition causing the trap may not be fixed or it may be fixed improperly in order to ascertain how the processor will respond to this "fix". For instance, in response to the first trap the trap is incorrectly fixed so that it will immediately trap again. When it does trap the second time, the trap handler could actually fix the condition causing the trap. The trap handler may also simply end the test case in response to an interrupt condition.

Block 50 provides for other tasks to be performed. Examples of other tasks might include altering the state of the processor in a manner unrelated to the trap such as changing the register contents, changing the return privilege state of the processor, altering the state of the cache, generating random instructions in the trap handler itself, and altering the state of the TLB. For instance, if a TLB miss occurs, the dynamic portion of the trap handler could make the next floating point instruction cause a trap even though this is unrelated to a TLB miss. The tasks performed at Block 50 may be performed later in the flow, such as after Block 52, Block 54 or Block 56.

Blocks 48 and 50 are illustrative of the dynamic nature of the trap handler of the present invention. Thus when the trap handler has completed its response to the trap, the processor may return to its pre-trap state, halt and signify an error, nullify an instruction, or perform any other action prescribed by the code created at Blocks 48 or 50. The trap code handler is thus free to handle the trap in any way desired.

Decision Block 52 is illustrative of another way in which the dynamic portion of the trap handler of the present invention provides great flexibility. At Decision Block 52, the inquiry is whether it is necessary to update the trap vector table. There are a number of reasons why it may be necessary or become necessary to update the trap vector table.

The boundary conditions of entering a trap handler and exiting a trap handler pose special concerns. It is therefore sometimes desirable to dynamically alter the initial and final instructions that are executed in response to a trap in order to test the boundary conditions of entering and leaving a trap handler. The final instructions of a trap handler may be tested by having the dynamic portion of the trap handler generate random instructions at the end of the trap handler code prior to returning to the code. The initial instructions of the trap handler may be tested in a variety of ways. For instance, a new trap vector table could be loaded every time a new trap is taken. Or since thousands of test cases are likely to be generated, random instructions loaded as the first instructions of the static portion of the trap handler could be relied upon to adequately test the initial instructions of a trap handler. The front loading of random instructions in the trap vector table is illustrated in the HP-PA IVA table of FIG. 2.

In addition to predictable and unpredictable traps, it is further possible to have a predictable trap that may become unpredictable or to have an unpredictable trap that may become predictable. For instance, a TLB table that fills up is an example of a predictable trap that becomes unpredictable once the TLB table fills up. A TLB table that is purged of all translations becomes empty and is an example of an unpredictable trap that becomes predictable. When a trap is changing from predictable to unpredictable or from unpredictable to predictable, a different trap vector table can be loaded. It is conceivable to have multiple trap tables, one for every combination of predictable and unpredictable traps.

If the trap vector table is to be updated, then Block 54 updates the trap vector table. Generally a new trap vector table for a particular trap type can already be available or it can be created as needed. For the HP-PA, an efficient way to update the trap vector table is to load a new value into the IVA register. This new value would point to a new value that had already been created for this purpose.

Sometime during the dynamic portion of the trap handler, the trap code pointer and the trap data pointer will normally be updated. These pointers may be updated at any time before the end of the dynamic portion of the trap handler so that when the next interrupt condition occurs, the trap code pointer and the trap data pointer will point to the code and the data, respectively, of the next trap handler.

Following generation of the dynamic portion of the trap handler, the flow returns to Block 32 of FIG. 4.

The present invention will be illustrated using HP-PA architecture as an example. It should be noted that the use of the HP-PA architecture is for illustrative purposes only. The present invention may be used with other architectures without departing from the spirit and scope of the invention.

Figure 2:
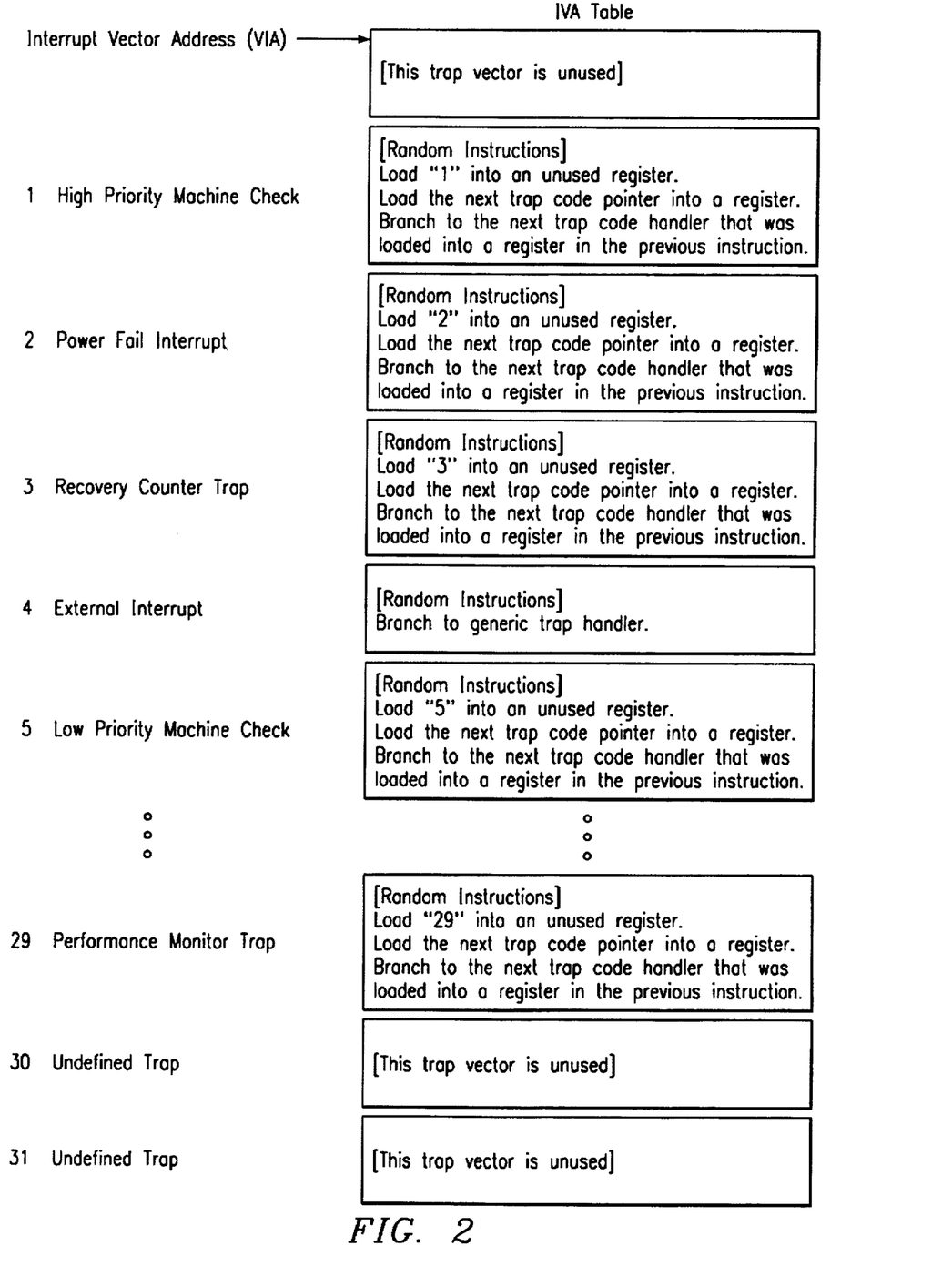
FIG. 2 illustrates the trap vectors of the HP-PA IVA (Interrupt Vector Address) table, according to an example of the present invention.

According to the conventions of HP-PA architecture, the IVA table contains 32 vector addresses representative of 32 traps, each having eight instructions per trap vector for a total of 1024 bytes as shown in FIG. 2. Each recognized trap type is consecutively allocated 8 instructions words or a 32 byte trap vector table entry which is offset from a fixed location known as the Instruction Vector Address (IVA). When a trap occurs, the processor calculates the location of the trap vector by multiplying the trap number by the trap vector allocated size of 32 bytes to render an offset and then adding that offset to the IVA. The location of the trap vector is thus represented by the following equation:

$$IVA+(\text{trap number} * \text{trap vector size})=IVA+\text{offset}$$

For purposes of this example, assume that the trap code pointer is set to 0×20000, the trap data pointer is set to 0×30000, and the Interrupt Vector Address (IVA) is set to 0×40000. The trap code pointer and the trap data pointer are stored in Control registers 24 (CR24) and 25 (CR25), respectively. The trap data pointer located at 0×30000 is loaded with the data necessary to verify the trap, such as the Interrupt Instruction Address Space Queue IIASQ (0×1000) and the Interrupt Instruction Address Offset Queue IIAOQ (1×10).

Consider a test case running in virtual mode at space 1×1000 with an offset of 0×0. Assume that the first four instructions of the test case execute at locations 0×1000.00, 0×1000.04, 0×1000.08, and 0×1000.0c with no traps. At the next instruction at location 0×1000.10, suppose an ITLB miss trap (trap 6) is generated. The IIASQ is loaded with 0×1000 and the IIAOQ is loaded with 0×10.

The static trap vector instructions, located at IVA + (trap number * trap vector size), will load the trap number (6) for that trap vector into a register (reg 1), load the trap code pointer (0×20000) in CR24 into a register (reg 2), and then branch to the trap code pointer location. In this example the trap vector instructions are located starting at (0×40000)+(6*0×20) which is equal to 0×400c0.

Before the random code generator simulates the code at the location pointed to by the trap code pointer located at 0×20000, it creates and loads the instructions of the dynamic trap handler at that address. As illustrated in FIG. 5, these instructions may perform any number of optional functions. For instance, the instructions may verify that the trap vector is what was expected by comparing the trap number loaded in the IVA trap vector with the expected trap number (6). The instructions may also verify that the architecturally defined trap parameters for that trap type are defined and that the trap occurred where it was expected to occur (in this example, that the IIASQ is at 0×1000 and the IIAOQ is at 0×10). Additionally, the instructions may or may not handle the actual trap. This may be mean that nothing else is done or it may mean, as in this example, that the trap condition is addressed by inserting the required translation into the TLB so that the trap will return to the code to start executing again. Note that since the expected state of the processor is known, the trap is not required to be handled generically according to a prior art technique such as walking a page table. Before the end of the dynamic trap handler code, the trap code pointer and the trap data pointer will most probably be updated.

The present invention offers several advantages over the prior art. The trap parameters can be verified by the executing code, thereby facilitating the early detection of failures. Any number of traps can occur even of the same type, without loss of verifiability. The trap handler can inject additional changes to processor state that are difficult to accomplish in the main body of the code. Multiple traps on the same instruction, even of the same type for an incompletely corrected trap condition, may be performed without loss of verifiability and trap priority. Additionally, the present invention provides for the trap order to be implicitly verified. Further, the present invention allows for a trap to potentially be handled more directly with fewer instructions.

While the invention has been particularly shown and described with reference to a preferred embodiment, it will be understood by those skilled in the art that various changes in form and detail may be made therein without departing from the spirit and scope of the invention.

What is claimed is:

1. A method for the functional testing of a processor, comprising the steps of:

generating a test case capable of generating a dynamic trap handler in response to a predictable interrupt condition;

simulating the test case in order to obtain an expected state of the processor;

loading the test case onto an entity which will execute the test case;

executing the test case in order to obtain an actual state of the processor, wherein the test case is executed by the entity to be tested; and comparing the actual state of the processor to the expected state of the processor.

2. The method of claim 1, wherein the step of generating the test case is managed by a random code generator.

3. The method of claim 1, wherein the step of simulating the test case in order to obtain the expected state of the processor is performed by an architectural simulator.

4. The method of claim 1, wherein the entity which will execute the test case is the processor.

5. The method of claim 1, wherein the entity which will execute the test case is a functional simulator model.

6. The method of claim 1, wherein if as a result of the step of comparing the actual state of the processor to the expected state of the processor the actual state of the processor is not equal to the expected state of the processor then the processor has failed the test case, and wherein if as a result of the step of comparing the actual state of the processor to the expected state of the processor the actual state of the processor is equal to the expected state of the processor then the processor has passed the test case.

7. A method for the functional testing of a processor, comprising the steps of:

generating a test case capable of generating a dynamic trap handle in response to a predictable interrupt condition, wherein the step of generating a test case capable of creating a dynamic trap handler in response to a predictable interrupt condition, further comprises the steps of:

initializing the test case;
generating a random instruction;
simulating the random instruction in order to obtain an expected state of the processor;
updating the expected state of the processor;
determining whether an interrupt condition has occurred, wherein if the interrupt condition has not occurred comprising the additional step of:
　determining whether to generate another random instruction;
if an interrupt condition has occurred, determining whether the interrupt condition is predictable, wherein if the interrupt instruction is not predictable comprising the additional steps of:
　simulating a static trap handler; and
　updating the expected state of the processor;
if a predictable interrupt condition has occurred, generating a dynamic portion of the dynamic trap handler and comprising the further steps of:
　simulating a static portion of the dynamic trap handler and simulating the dynamic portion of the dynamic trap handler; and
　updating the expected state of the processor; and
determining whether to generate another random instruction,
simulating the test case in order to obtain an expected state of the processor;
loading the test case onto an entity which will execute the test case;
executing the test case in order to obtain an actual state of the processor, wherein the test case is executed by the entity to be tested; and
comparing the actual state of the processor to the expected state of the processor.

8. The method of claim 7, wherein the step of generating the dynamic portion of the dynamic trap handler comprises the additional steps of:
　verifying the trap number of the predictable interrupt condition;
　verifying one or more trap parameters of the predictable interrupt condition;
　generating one or more instructions to handle the predictable interrupt condition; and
　updating a trap code pointer and a trap data pointer.

9. The method of claim 7, wherein during the step of initializing the test case a trap code pointer and a trap data pointer are initialized and at least one trap vector table is initialized.

10. A method for generating a test case capable of creating a dynamic trap handler in response to a predictable interrupt condition, comprising the steps of;
initializing the test case;
generating a random instruction;
simulating the random instruction in order to obtain an expected state of the processor;
updating the expected state of the processor;
determining whether an interrupt condition has occurred, wherein if the interrupt condition has not occurred comprising the additional step of:
　determining whether to generate another random instruction;
if an interrupt condition has occurred, determining whether the interrupt condition is predictable, wherein if the interrupt instruction is not predictable comprising the additional steps of:
　simulating a static trap handler; and
　updating the expected state of the processor;
if a predictable interrupt condition has occurred, generating a dynamic portion of the dynamic trap handler and comprising the further steps of:
　simulating a static portion of the dynamic trap handler and simulating the dynamic portion of the dynamic trap handler; and
　updating the expected state of the processor; and
determining whether to generate another random instruction.

11. The method of claim 10, wherein during the step of initializing the test case a trap code pointer and a trap data pointer are initialized and at least one trap vector table is initialized.

12. The method of claim 10, wherein the step of generating a random instruction is performed by a random code generator.

13. The method of claim 10, wherein the step of simulating the random instruction is performed by an architectural simulator.

14. The method of claim 10, wherein the step of generating the dynamic portion of the dynamic trap handler comprises the additional steps of:
　verifying the trap number of the predictable interrupt condition;
　verifying one or more trap parameters of the predictable interrupt condition;
　generating one or more instructions to handle the predictable interrupt condition; and
　updating a trap code pointer and a trap data pointer.

15. The method of claim 14, comprising the further step of determining whether the processor will return to code being executed when the predictable interrupt condition occurred.

16. The method of claim 14, comprising the further step of determining whether to update a trap vector table of the processor.

17. The method of claim 10, wherein during the step of simulating the static portion of the dynamic trap handler, a trap number of the interrupt condition is loaded, a trap code pointer is loaded, and the processor is prepared for branching to a location pointed to by the trap code pointer.

18. A method for generating a dynamic portion of a dynamic trap handler in response to a predictable interrupt condition, comprising the steps of:
　verifying the trap number of the predictable interrupt condition;
　verifying one or more trap parameters of the predictable interrupt condition;
　generating one or more instructions to handle the predictable interrupt condition; and
　updating a trap code pointer and a trap data pointer.

19. The method of claim 18, comprising the further step of determining whether the processor will return to code being executed when the predictable interrupt condition occurred.

20. The method of claim 18, comprising the further step of determining whether to update a trap vector table of the processor.

* * * * *